United States Patent
Shetty et al.

(10) Patent No.: US 11,346,216 B2
(45) Date of Patent: May 31, 2022

(54) ESTIMATION OF FRACTURE COMPLEXITY

(71) Applicant: Halliburton Energy Services, Inc., Houston, TX (US)

(72) Inventors: Dinesh Ananda Shetty, Sugarland, TX (US); Harold Grayson Walters, Tomball, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 205 days.

(21) Appl. No.: 16/836,208

(22) Filed: Mar. 31, 2020

(65) Prior Publication Data
US 2021/0301654 A1 Sep. 30, 2021

(51) Int. Cl.
*E21B 49/00* (2006.01)
*E21B 43/26* (2006.01)
*G01V 99/00* (2009.01)

(52) U.S. Cl.
CPC ........... *E21B 49/006* (2013.01); *E21B 43/26* (2013.01); *E21B 49/00* (2013.01); *G01V 99/005* (2013.01)

(58) Field of Classification Search
CPC ............................... E21B 49/006; E21B 43/26
USPC .................................................... 166/250.1
See application file for complete search history.

(56) References Cited

U.S. PATENT DOCUMENTS

| | | | |
|---|---|---|---|
| 4,783,769 A | 11/1988 | Holzhausen | |
| 4,802,144 A | 1/1989 | Holzhausen et al. | |
| 5,070,457 A * | 12/1991 | Poulsen | E21B 49/006 |
| | | | 702/12 |
| 5,206,836 A | 4/1993 | Holzhausen et al. | |
| 5,524,709 A * | 6/1996 | Withers | C04B 40/0092 |
| | | | 166/250.1 |

(Continued)

FOREIGN PATENT DOCUMENTS

| | | | | |
|---|---|---|---|---|
| EP | 0476758 A2 * | 3/1992 | ........... | E21B 49/008 |
| WO | WO-2014105659 A1 * | 7/2014 | ........... | G01V 99/005 |

(Continued)

OTHER PUBLICATIONS

Rahmani, et al., Impedance Analysis as a Tool for Hydraulic Fracture Diagnostics in Unconventional Reservoirs, Australian Journal of Basic and Applied Sciences, 2013 ISSN 1991-8178.

(Continued)

*Primary Examiner* — Frederick L Lagman
(74) *Attorney, Agent, or Firm* — John Wustenberg; C. Tumey Law Group PLLC (57) ABSTRACT

A method of determining fracture complexity may comprise receiving one or more signal inputs from a fracturing operation, calculating an observed fracture growth rate based at least partially on the one or more signal inputs, calculating a predicted fracture growth rate, determining a fracture complexity value, and applying a control technique to make adjustments a hydraulic stimulation operation based at least in part on the fracture complexity value. Also provided is a system for determining a fracture complexity for a hydraulic fracturing operation may comprise a hydraulic fracturing system, a sensor unit to receive one or more signal inputs, a calculating unit, a fracture complexity unit, and a controller unit to apply a control technique to adjust one or more hydraulic stimulation parameters on the hydraulic fracturing system.

20 Claims, 5 Drawing Sheets

(56) References Cited

U.S. PATENT DOCUMENTS

| | | | |
|---|---|---|---|
| 8,168,570 B2 | 5/2012 | Barron et al. | |
| 10,572,829 B1* | 2/2020 | Willinger | G01V 1/42 |
| 2004/0016541 A1* | 1/2004 | Detournay | E21B 43/26 |
| | | | 166/250.1 |
| 2008/0183451 A1* | 7/2008 | Weng | E21B 43/26 |
| | | | 703/10 |
| 2009/0065198 A1* | 3/2009 | Suarez-Rivera | E21B 43/267 |
| | | | 166/250.1 |
| 2012/0318500 A1* | 12/2012 | Urbancic | G01V 1/288 |
| | | | 166/250.1 |
| 2014/0262232 A1* | 9/2014 | Dusterhoft | E21B 43/26 |
| | | | 166/250.1 |
| 2014/0278316 A1* | 9/2014 | Dusterhoft | E21B 43/25 |
| | | | 703/10 |
| 2014/0299315 A1* | 10/2014 | Chuprakov | E21B 47/00 |
| | | | 166/250.1 |
| 2014/0305638 A1* | 10/2014 | Kresse | E21B 43/26 |
| | | | 166/250.1 |
| 2016/0010443 A1* | 1/2016 | Xu | E21B 47/07 |
| | | | 166/250.1 |
| 2016/0108705 A1* | 4/2016 | Maxwell | E21B 43/267 |
| | | | 166/250.1 |
| 2018/0217285 A1 | 8/2018 | Walters et al. | |
| 2018/0306015 A1 | 10/2018 | Shetty et al. | |
| 2018/0347332 A1 | 12/2018 | Bestaoui-Spurr et al. | |
| 2019/0145251 A1* | 5/2019 | Johnson | E21B 43/267 |
| | | | 166/250.1 |
| 2019/0309603 A1* | 10/2019 | Sepehrnoori | E21B 41/0092 |

FOREIGN PATENT DOCUMENTS

| | | | | | |
|---|---|---|---|---|---|
| WO | WO-2015178931 A1 * | 11/2015 | | | G01V 1/302 |
| WO | WO-2018035498 A1 * | 2/2018 | | | E21B 49/008 |

OTHER PUBLICATIONS

Wasantha, P. L. P., & Konietzky, H. (2017) Hydraulic Fracture Propagation under Varying In-situ Stress Conditions of Reservoirs. Procedia Engineering, 191, 410-418.

Carey, et al., Analysis of Water Hammer Signatures for Fracture Diagnostics, SPE-174866-MS, 2015.

* cited by examiner

ESTIMATION OF FRACTURE COMPLEXITY

BACKGROUND

Hydrocarbon-producing wells are stimulated by hydraulic fracturing operations to increase the formation surface area exposed to the wellbore to enhance hydrocarbon recovery rates. Determination of the fracture complexity during and after fracturing may be used to interpret the fracturing process and revise the configuration of subsequent treatments or a treatment in progress. In some cases, pressure response resulting from hydraulic stimulation may be interpreted to provide operational insights to inform decisions.

Though some principles are similar across hydraulic operations, each application is unique and requires the collection of data and the participation of experienced personnel to optimize efficiency of the operation. Presently, operators may not know in real time the complexity of fractures created during fracturing operations. Knowing fracture complexity may be useful to planning and performing additional treatments during fracture stimulation operations.

BRIEF DESCRIPTION OF THE DRAWINGS

These drawings illustrate certain aspects of some of the embodiments of the present disclosure and should not be used to limit or define the disclosure.

DETAILED DESCRIPTION

Embodiments of the present disclosure will be described more fully hereinafter with reference to the accompanying drawings in which like numerals represent like elements throughout the several figures, and in which example embodiments are shown. Embodiments of the claims may, however, be embodied in many different forms and should not be construed as limited to the embodiments set forth herein. The examples set forth herein are non-limiting examples and are merely examples among other possible examples.

The present disclosure may relate to subterranean fracturing operations, and, in one or more implementations, to hydraulic fracturing methods including estimation of fracture complexity. In response to the estimation of fracture complexity, adjustments may be made to the fracturing operation for control of fracture complexity in real time. In at least one embodiment, the techniques for estimation of fracturing complexity may combine a model with measurements to allow real-time control of the complexity of the downhole fracturing complexity. By enabling real-time control of downhole fracture complexity, hydraulic connectivity of the fracture system may be increased, thus leading to enhanced recovery.

Figure 1:
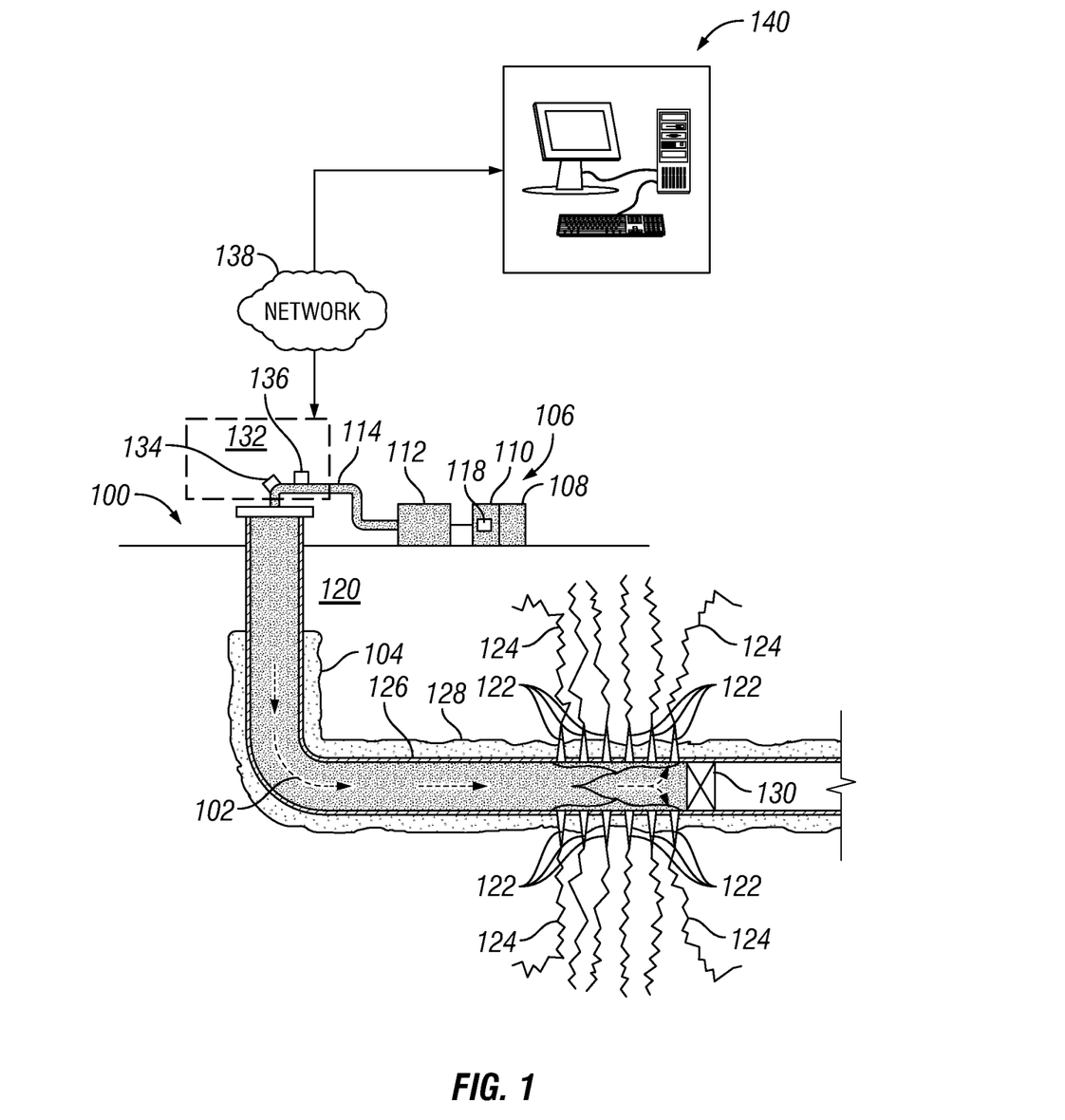
FIG. 1 is a schematic view of an example well system utilized for hydraulic fracturing including an information handling system.

FIG. 1 illustrates an example of a well system 100 that may be used to introduce hydraulic fracturing fluid 102 into a subterranean formation 120 surrounding a wellbore 104. Well system 100 may include a fluid handling system 106, which may include fluid supply 108, mixing equipment 110, pumping equipment 112, and wellbore supply conduit 114. Pumping equipment 112 may be fluidly coupled with the fluid supply 108 and wellbore supply conduit 114 to communicate a fracturing fluid 102 into wellbore 104. Fracturing fluid 102 may include a proppant 118 introduced via mixing equipment 110. The fluid supply 108 and pumping equipment 112 may be above the surface while wellbore 104 is below the surface.

Data such as pressure, density, and rate may be monitored during operation of the well system. For example, well system 100 may be used for the pumping of a pad or pre-pad fluid into the subterranean formation 120 into one or more perforations 122 at a pumping rate and pressure at or above the fracture gradient of the subterranean formation to create and maintain at least one fracture 124 in subterranean formation 120. The pad or pre-pad fluid may be substantially free of solid particles such as proppant, for example, less than 1 wt. % by weight of the pad or pre-pad fluid. Well system 100 may then pump the fracturing fluid 102 into subterranean formation 120 surrounding the wellbore 104. Generally, a wellbore 104 may include horizontal, vertical, slanted, curved, and other types of wellbore geometries and orientations, and the fracturing fluid 102 may generally be applied to subterranean formation 120 surrounding any portion of wellbore 104, including fractures 124. The wellbore 104 may include the casing 126 that may be cemented (or otherwise secured) to the wall of the wellbore 104 by cement sheath 128.

Perforations 122 may allow communication between the wellbore 104 and the subterranean formation 120. As illustrated, perforations 122 may penetrate casing 126 and cement sheath 128 allowing communication between interior of casing 126 and fractures 124. A plug 130, which may be any type of plug for oilfield applications (e.g., bridge plug), may be disposed in wellbore 104 below the perforations 122. In accordance with systems and/or methods of the present disclosure, a perforated interval of interest (depth interval of wellbore 104 including perforations 122) may be isolated with plug 130. A pad or pre-pad fluid may be pumped into the subterranean formation 120 at a pumping rate and pressure at or above the fracture gradient to create and maintain at least one fracture 124 in subterranean formation 120. Then, proppant 118 which may be mixed with an aqueous based fluid via mixing equipment 110, and added to fracturing fluid 102, may be pumped via pumping equipment 112 from fluid supply 108 down the interior of casing 126 and into subterranean formation 120 at or above a fracture gradient of the subterranean formation 120. Pumping the fracturing fluid 102 at or above the fracture gradient of the subterranean formation 120 may create (or enhance) at least one fracture (e.g., fractures 124) extending from the perforations 122 into the subterranean formation 120. Alternatively, the fracturing fluid 102 may be pumped down production tubing, coiled tubing, or a combination of coiled tubing and annulus between the coiled tubing and the casing 126.

While perforations 122 are depicted in FIG. 1, it should be noted that the present disclosure is not limited to perforations and includes openings and fluid outlets in which hydraulic fluid may exit the wellbore. Such fluid outlets may include one or more slots or other any number of other shape configurations. The fractures 124 shown in FIG. 1 may represent natural and/or stimulated fractures in the subterranean formation 120.

Data may be logged during operation whereby at least a portion of the fracturing fluid 102 may enter the fractures 124 of subterranean formation 120 surrounding wellbore 104 by way of perforations 122. Perforations 122 may extend from the interior of casing 126, through cement sheath 128, and into subterranean formation 120. Hydraulic operation data attributes, such as pressure, density, and flow rate may be measured by instrumentation 132 in communication with well system 100. As shown, instrumentation 132 is coupled to wellbore supply conduit 114 to log one or more hydraulic operation data attributes. Instrumentation 132 may include one or more densometers 134, one or more transducers 136, as well as other sensor devices. It should be noted that instrumentation 132 including densometer 134 and transducer 136 are illustrated diagrammatically and are not limited to the positions shown in FIG. 1.

FIG. 1 additionally illustrates an example of an information handling system 140 which may be in communication with one or more components of well system 100 such as instrumentation 132 and fluid handling system 106 via a network 138. The information handling system 140 may include any instrumentality or aggregate of instrumentalities operable to compute, estimate, classify, process, transmit, receive, retrieve, originate, switch, store, display, manifest, detect, record, reproduce, handle, or utilize any form of information, intelligence, or data for business, scientific, control, or other purposes. For example, an information handling system 140 may be a personal computer, a network storage device, or any other suitable device and may vary in size, shape, performance, functionality, and price.

Accordingly, various hydraulic operations data may be measured and collected at the well system during hydraulic fracturing operations. The hydraulic operations data may include, but is not limited to, volumetric flow rate (e.g., of the fracturing fluid 102), fluid pressure at the wellhead, surface sand concentration, density (e.g., of the fracturing fluid 102). The hydraulic operations data may also include various attributes of the well configuration, such as pipe diameter (e.g., inner diameter), depth of perforations 122, and friction profile, among others. The downhole environment can include induced fractures, natural fractures, formations, and the like.

Figure 2A:
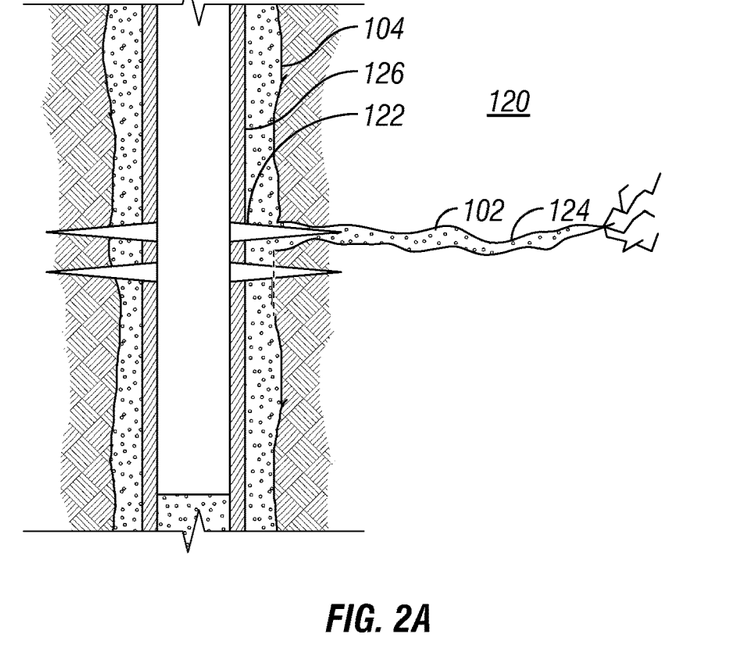
FIG. 2A illustrates a view of a fracture connected to a wellbore.
Figure 2B:
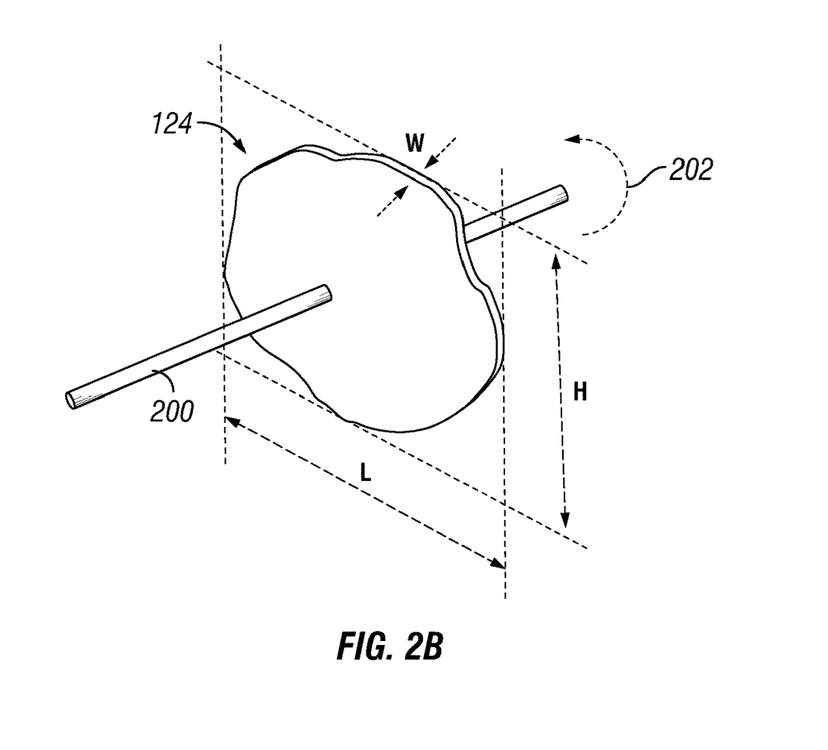
FIG. 2B is an isometric view of the fracture.

Turning to FIGS. 2A and 2B, as discussed in further detail below, fracture complexity may be beneficial to understand and manipulate through operational control in real time. An understanding of fracture complexity may involve a number of inputs such as fracture dimensions. FIG. 2A illustrates an isometric view of fracture 124 in accordance with present embodiments. During fracturing operations, fracturing fluid 102, as discussed above, may be utilized to form fracture 124. Fracturing fluid 116 may cause one or more fractures to be created or extended in a subterranean formation 120. As illustrated fracture 124 is shown extending from wellbore 104. Fracturing of subterranean formation 120 may be accomplished using any suitable technique. By way of example, a fracturing treatment may include introducing a fracturing fluid 102 into subterranean formation 120 at or above a fracturing pressure. Fracturing fluid 102 may be introduced by pumping fracturing fluid 102 through casing 126, perforations 122, and into subterranean formation 120 surrounding wellbore 104. Alternatively, a jetting tool (not shown) may be used to initiate fracture 124.

As discussed in further detail below, the fracture dimensions of fracture 124 may be beneficial to understand and manipulate through operational control in real time. Fracture dimensions may include, length, height, width, radius, and/or the like of fracture 124. FIG. 2B illustrates a cross section view of fracture 124 along a longitudinal axis 200 in accordance with present embodiments. The longitudinal axis 200 as shown in FIG. 2B represents orientation of wellbore 104 as shown in FIG. 1. As illustrated in FIG. 2B, length is identified by "L," width is identified as "W," height is identified as "H," and orientation is identified as arrow 202.

Understanding fracture complexity may be beneficial to fracture operations because it allows for a real time analysis of fractures 124 and if the fractures 124 produced are conforming to design goals. For example, to avoid well interference or to achieve certain growth rates. Controlling well interference is defined as controlling fracture length and height such that it does not connect to another wellbore or the fracture network associated with nearby wellbores. Growth rates are defined as maximizing complexity, achieving certain uniformity of clusters, or targeting certain pumping flowrate to fracture growth rate ratio. Another additional benefit of knowing fracture complexity is to use the measured fracture complexity to tune a fracture simulator in real time and use it to predict future operations with additional accuracy. This may allow the simulator to be used to control one or more aspects of the fracture operation. Identifying fracture complexity may allow personnel to manipulate the fracture complexity and dimensions, which may increase fluid production.

According to an embodiment of the present disclosure, a method to utilize a complex fracture model and partial estimation of natural fracture may be used to apply an optimization algorithm to infer a stimulated dimensions corresponding to an observed growth rate is provided. It may be desirable to execute a fracturing process to exploit existing natural fractures and to create new fractures in the subterranean formation 120. To do this, the wellbore 104 is perforated to allow injection of fracturing fluids and proppants into the subterranean formation 120. The perforations may be grouped into clusters. Clusters may be, in turn, grouped into stages.

A "fracturing plan" may be defined by a set of controllable input variables. The set of controllable input variables may include the number and location of stages, the number and location of clusters within the stages, the number and location of perforations within the clusters, the volume of hydraulic fluid pumped, and the volume of proppant pumped. The controllable input variables are processed to produce stimulated dimensions that shows the extent of stimulation within the subterranean formation 120 resulting from the fracturing plan.

In at least one embodiment, the technique described herein uses a growth-rate-based indicator of the effectiveness of hydraulic fracturing. For example, the technique may seek to optimize, or, in some situations to maximize, a "complexity index." An example of a complexity index may be a comparison of the total length of fracture to the size of a fracture formation. A fracture formation may be defined by points on a stimulated dimensions whose location is determined or influenced by the values of the controllable input variables. For example, in FIG. 4, such points may include the end points of the stimulated regions 408 (only one is labeled) or the end points of the stimulated regions containing propped beds 410 (only one is labeled).

Figure 3:
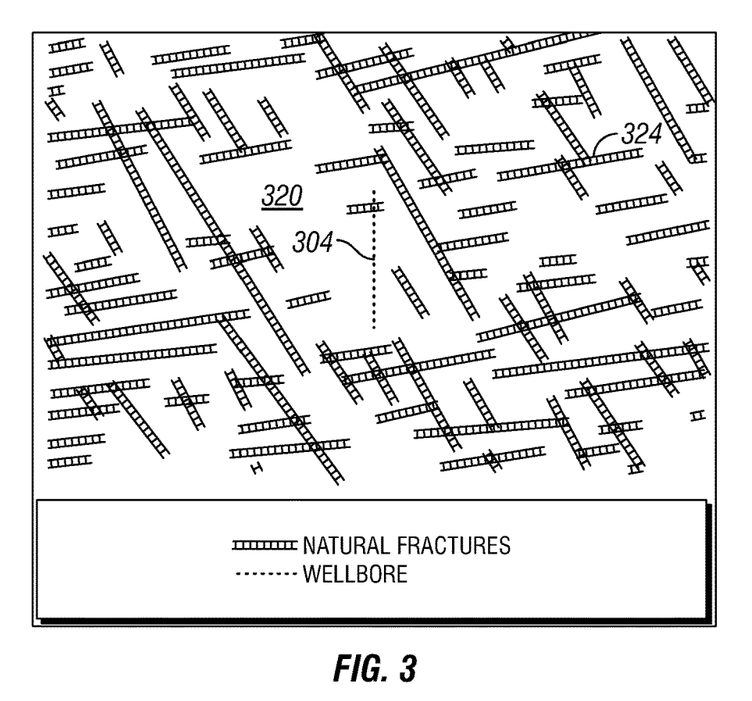
FIG. 3 illustrates a representation of a naturally fractured subterranean formation with a wellbore.

FIG. 3 is a representation of a naturally fractured subterranean formation 120 with a wellbore. The subterranean formation 320 includes natural fractures 324 (only one of the natural fractures is labeled; the key on FIG. 3 identifies the symbols used on the figure). A wellbore 304 has been drilled into the subterranean formation 320. It will be understood that FIG. 3 is a two-dimensional ("2D") representation of a three-dimensional ("3D") space as is indicated by overlapping natural fractures 324.

Figure 4:
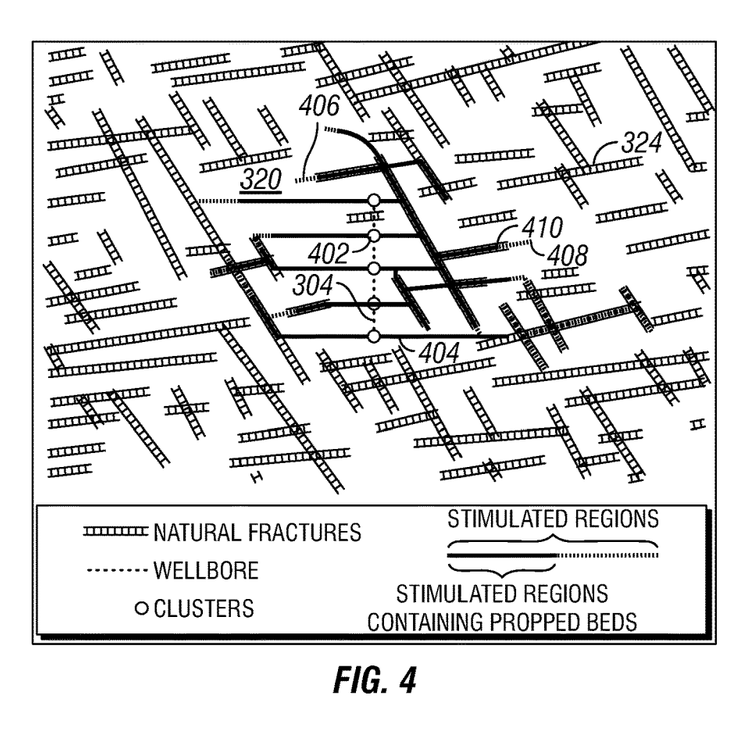
FIG. 4 illustrates a representation of the naturally fractured subterranean formation of FIG. 3 with a representation of stimulated dimensions produced by a fracturing plan.

FIG. 4 is a representation of the naturally fractured subterranean formation 320 and wellbore of FIG. 3 with a representation of a stimulated geometry produced by a fracturing plan. As can be seen, several clusters 402 (only one is labeled) have been identified along the wellbore 304. In addition, the volumes of fracturing fluid and proppant have been specified resulting in stimulated regions 404 (only one is labeled) and the parts of the stimulated region containing the propped bed (where the bed height is assumed to be relevant only if it is above some threshold value, for example 10% of the fracture height) 406 (only one is labeled), which are indicated by the symbology defined in the key to FIG. 4, and which represent the stimulated geometry produced by the fracturing plan. It will be understood that varying one or more of the controllable input variables will likely result in a different stimulated geometry.

One challenge involves evaluating the different stimulated geometries to select an optimum fracturing plan. In general, hydraulic fracturing efficiency is assessed as the half length of generated fracture. However, such metric typically is applicable only to symmetric planar fractures, and the possibility of obtaining symmetric planar fractures for realistic problems is unlikely. The technique described, according to an embodiment herein uses a different type of metric to assess the impact of hydraulic fracturing.

It will be understood hydraulic stimulation geometry need not be limited to the end points of the stimulated regions 408 or the end points of the stimulated regions containing propped beds 410. One example of such a geometry is a circle centered against the center of clusters or an ellipse that contains all the clusters.

A fracture simulator may be run with an initial set of controllable input variables to produce a stimulated geometry of the form shown in FIG. 2A. Alternatively, the stimulated geometry may be derived by alternative techniques, such as be applying fracture mapping algorithms to micro seismic measurements or to measurements from surface tiltmeters.

Figure 5:
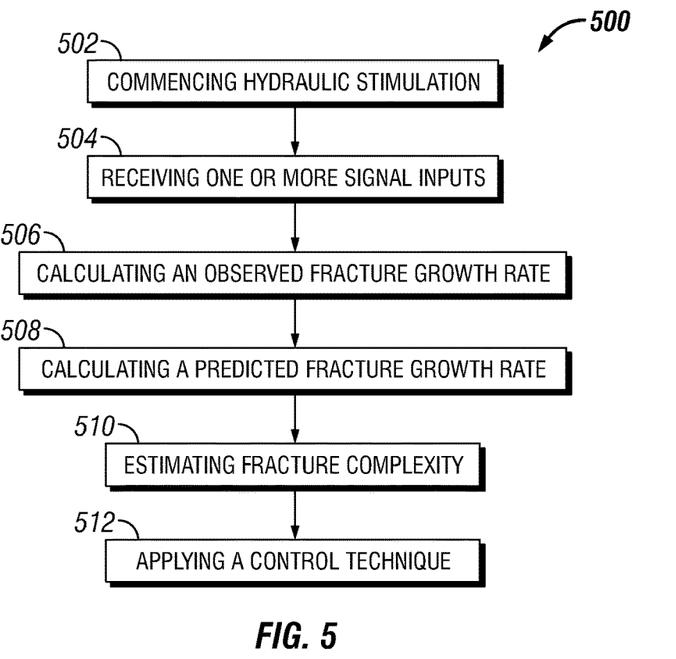
FIG. 5 illustrates a methodology of calculating fracture complexity in accordance with one or more embodiments of the disclosure.

FIG. 5 illustrates a workflow 500 for determining hydraulic fracture complexity according to one or more embodiments of the present disclosure. In block 502, commencing hydraulic stimulation is carried out, followed by block 504, where receiving one or more signal inputs is performed. In block 506, the step of calculating an observed fracture growth rate occurs. In block 508, the step of calculating a predicted fracture growth rate occurs. In block 510, the step of estimating fracture complexity is carried out. In block 512, the step of applying a control technique is performed. It will be appreciated that one or more steps of workflow 500 may be processed by information handling system 140 (e.g., referring to FIGS. 1 and 6) to determine and provide information concerning an ongoing or prior hydraulic stimulation operation. It should be noted that one or more steps of workflow 500 may be implemented by information handling system 140 as either software which may be disposed in memory 706.

As illustrated in FIG. 5, workflow 500 begins with block 502, with the step of commencing hydraulic stimulation. By way of example, commencing a hydraulic stimulation operation may be carried out at a well system 100 (e.g. referring to FIG. 1). By way of example, the hydraulic stimulation operation may include creating one or more fracture 124 (e.g., as described above with respect to FIG. 1).

In block 504, the step of receiving one or more signal inputs is performed. Signal inputs may include measured information about ongoing hydraulic stimulation operations such as pressure, stress, or micro-seismic signals from the field. Pressures may be read on surface or at any depth along the treatment well. Surface pressures may also be collected from any nearby wells. Stress may be generally measured based on digital acoustic sensing (DAS) fiber on an offset well. Microseismic measurements may come from surface, downhole tools, observation wells or from fiber on the offset wells. According to one embodiment of the present disclosure, one approach for computing fracture dimensions makes use of surface pressure during water hammer, which may be applicable for other categories of measurements as well, however, the model for computing the length from the measurement may differ. These signal inputs are affected by the created hydraulic fractures (e.g., fractures 124). Signal inputs, such as a pressure signal may be high frequency or low frequency measurement which may indicate excitement of the hydraulic fracture system. It will be appreciated that signal inputs and measurements therein, may be continuous or intermittent. One or more signal inputs be collected or received by information handling system 140 from the well system 100. By way of example, information from instrumentation 132, fluid handling system 106, and other equipment in communication with the well system 100 are provided to information handling system 140. Sampling rates for signal inputs may vary, but may include, for example, one second data collection intervals.

In block 506, the step of calculating an observed fracture growth rate is performed. The fracture growth rate calculated in block "506" is referred to as "observed" because it is calculated based on actual signal inputs measured during the fracturing operation. It will be appreciated that calculation of an observed fracture growth rate may be done via information handling system 140. For example, after receiving all or a portion of the aforementioned signal inputs, the information handling system 140 may calculate an observed fracture growth rate. The observed growth rate may be calculated based on the signal inputs. Because these signal inputs (e.g., pressure, stress, or micro-seismic signals) are affected by the created hydraulic fractures, the signal inputs may be used to determine fracture dimensions, such as fracture height, width, fracture length, and fracture half-length. From the fracture dimensions, an observed fracture growth rate may be calculated. By way of example, the observed fracture growth rate may a time derivate of the fracture dimensions.

Any suitable model may be used for determining fracture dimensions from the signal inputs. Suitable models may include but are not limited to a Resistance Inductance Capacitance (RLC) model, Resistance Inertance Capacitance (RIC) model, Hydraulic Impedance Testing (HIT) model, Time Frequency analysis model, among others. Certain of these models (e.g., RLC model, RIC model, HIT model) can determine equivalent fracture dimensions by conserving the downhole environment a an electrical circuit. The models derive formula that relate fracture dimensions with other variables such at signal inputs (e.g., pressure) can be used to calculate fracture dimensions. To simplify the calculations, certain of the models can make certain assumptions including that a single planar fracture of constant height and ellipsoidal cross-section (e.g., as shown on FIG. 2B) is created. This geometry can be referred to as a planar representation with a corresponding height, width, and length. In addition, the fracture dimensions obtained from these models may be considered "equivalent fracture dimensions" and may be based on the assumptions that the hydraulic fractures (e.g., fractures 124) are planar, bi-wing fractures where multiple fracture clusters per stage may actually be created. Thus, the calculated equivalent fracture length and width may be a combination of all the created fractures in communication with the wellbore for a single stage.

In at least one embodiment, the signal inputs may be provided to an RIC model for calculation fracture dimensions. The model may solve the following equations to obtain resistance (R), inductance (L), and Capacitance (C) such that the measured response (signal input) matches the response obtained by solving the following equations.

$$C\frac{\partial H}{\partial t} + \frac{\partial Q}{\partial x} = 0 \quad (1)$$

$$L\frac{\partial Q}{\partial t} + \frac{\partial H}{\partial x} + RQ = 0 \quad (2)$$

where R=resistance, L=inductance, Q=discharge rate, x=distance, H=Piezometric head, t=time, and C=capacitance. Piezometric head is related to the pressure as $$H = \frac{p}{\rho g} + z,$$

where $\rho$ is the density, g is the gravity, z is the depth. With these variables, the fracture dimensions of the planar representation may then be obtained using the following equations:

$$L_f = \sqrt{\frac{CL\Delta P}{\rho}} \quad (3)$$

where $L_f$=fracture half-length, C=capacitance, L=inductance, $\Delta P$=difference between the fracture pressure and in-situ stress (known value). It will be appreciated that fracture pressure is determined to be the difference between bottom hole pressure and the near wellbore pressure $$h_f = \frac{4EXC}{\pi^2 L_f^2} \text{ for short or } \sqrt{\frac{4EXC}{\pi^2 L_f(1-v^2)}} \text{ for long} \quad (4)$$

where $h_f$=fracture height, $L_f$=fracture half-length, C=capacitance, L=inductance, E=Young's modulus, X=elliptical integral of second kind, for short, wherein if $$2\frac{L_f}{h_f} < 1$$

for long.

$$w = \frac{\rho L_f}{L h_f} \quad (5)$$

$$\Delta p = \frac{4E}{\pi^2(1-v^2)} Xw \quad (6)$$

where $h_f$=fracture height, $L_f$=fracture half length, C=capacitance, L=inductance, E=Young's modulus, X=elliptical integral of second kind, w=fracture width, v=Poisson's ratio, and $\rho$=fluid density, $\Delta p$=change in pressure.

With the equivalent fracture dimensions from the model, the observed fracture growth rate may be calculated. For example, calculating the observed fracture growth rate may include taking a time derivative of the equivalent fracture dimensions to provide the observed fracture growth rate.

In block 508, the step of calculating a predicted fracture growth rate is performed. This fracture growth rate may be referred to as "predicted" because it may be derived from an input signal such as flow rate. Accordingly, this may produce two estimates of the fracture length, whereby one estimate may be based on the measurement of pressure(response), and the other may be based on a model using flowrate(input to the system), such as PKN for example. It will be appreciated that a first estimation may be based upon flowrate data–input, and a second estimation may be based on pressure data, such as stress or a microseismic response. According to one embodiment, a predicted fracture growth rate may be calculated by utilizing a simple planar fracture growth model to obtain an estimate of the fracture growth rate. In a simple planar fracture growth model, it is assumed that a single planar fracture of constant height and an ellipsoidal cross-section (e.g., as shown on FIG. 2B) is created. A planar model may imply that the fracture is bound to one plane, and may not deviate from that plane. It will be appreciated that having constant height or having elliptical cross sections may represent further simplifications (as may be done with PKN model). Inputs to the simple planar fracture growth model may include geomechanical inputs, such as Young's Modulus, Poisson's Ratio, and the like which may be known apriori. Should the pumping rate be maintained per one design according to an embodiment of the present disclosure, then this may be based on a fracturing plan. Alternatively, the model may make use of an average flowrate Further inputs to the simple planar fracture growth models may also use properties of the reservoir rock, fracturing fluid, and/or magnitude and direction of in-situ stress to predict fracture dimensions. It will be appreciated that a number of simple planar growth rate models may be employed including Perkins-Kern-Nordgren (PKN) model and/or Khristianovic-Geertsma-de Klerk (KGD) type of models to calculate a predicted fracture growth rate. Suitable fracture growth rate models may include two-dimensional or three-dimensional models. It will be appreciated that PKN and KGD represent two common 2-dimensional models used in fracture treatment design. The PKN model is normally used when the fracture length is greater than the fracture height, while the KGD model is typically used if fracture height is more than the fracture length. In certain formations, either of these two models can be used successfully to design hydraulic fractures. According to one embodiment, use of one or more models is employed to make decisions, as opposed to trying to precisely calculate values for fracture dimensions. By taking a time derivative of the predicted fracture dimension, the predicted fracture growth rate may be determined.

In at least one embodiment, a simple planar growth rate model (e.g., PKN model or KGD model) may be employed with known surface pressure and flowrate. For example, the following equations may be used for determination of predicted fracture dimensions in a KGD model:

$$L = 0.48 \left[ \frac{Q^3 G}{(1-v)\mu} \right]^{1/6} t^{2/3} \qquad (7)$$

Where L=fracture half-length, Q=injection rate, v=Poisson's ratio, G=shear modulus, and t=time since pumping starts; and $$w = 132 \left[ \frac{Q^3(1-4)\mu}{G} \right]^{1/6} t^{1/3} \qquad (8)$$

Where w=fracture width, v=Poisson's ratio, L=length, Q=injection rate, μ=fluid viscosity, G=shear modulus, and t=time since pumping starts. By taking a time derivative of the predicted fracture dimensions, the predicted fracture growth rate may be determined.

In block 510, the step of estimating fracture complexity is performed. According to one embodiment, estimation of fracture complexity may include obtaining the difference between the observed fracture growth rate and the predicted fracture growth rate as calculated in blocks 506 and 508, respectively, as given by complexity index, which may be a non-dimensional representation. This difference in growth rates indicates the influence of natural fracture interaction of the actual fracture and, thus, may also be an indication of fracture complexity. Natural fractures may divert the fluid out of the main fractures, which may lead to a shorted fracture length. This difference in growth may also be represented as a complexity index, as follows:

$$\text{proxy for complexity index} = \frac{L_{planar}}{L_{measured}} - 1 \qquad (9)$$

Where $L_{planar}$=predicted growth rate and $L_{measured}$=observed growth rate. Since the difference in growth rates and/or complexity index is an indication of fracture complexity, this estimate of fracture complexity can be used in determining whether a desirable fracture complexity has been obtained.

Additional operations may be performed with block 510, to obtain a better estimate of the complexity index in one or embodiments. For example, the stimulated geometry may be inferred, wherein the stimulated geometry may be inferred that corresponds to the observed growth rate and other available measurements (e.g., surface pressure, DAS flow rate, etc.). According to one embodiment, using a complex fracture model, and some partial estimation of natural fracture (from logs or micro-seismic measurements), an optimization algorithm may be utilized to infer the stimulated geometry. Use of such information may lead to improved identification of stimulated geometry from which an updated growth rate may be determined, which can increase the accuracy of a calculated estimation of a fracture complexity value. For example, an actual complexity index may be determined as follows using the updated growth rate:

$$\text{actual complexity index} = \frac{\text{Fracture Area}}{\text{Stimulated reservoir area}} \qquad (10)$$

In block 512, the step of applying a control technique is carried out. It will be appreciated that, according to an embodiment of the disclosure, applying a control technique may be carried out in order to make appropriate adjustments to an ongoing hydraulic stimulation operation. If the complexity index (e.g. proxy complexity index, actual complexity index) or the growth rate difference, is deemed to be insufficient, then an appropriate control technique for instance dropping the diverter or flow cycling can be performed. For example, the complexity index and/or growth rate difference may be compared to target value (e.g., target complexity index, target growth rate difference). Adjustments may be made in the fracturing operation until the desired complexity index and/or growth rate difference is achieved, which can be determined by this comparison. It will be further appreciated that continuous estimates of growth rate differences or the complexity index may be used as in a feedback loop to achieve the desired level of complexity index or the growth rate difference. A fracture growth rate may be estimated by taking the time derivative of the signal inputs and the resulting dimensional information. With the estimate of growth rate, a change in growth rate (Delta Growth Rate) can be computed. Then a closed loop controller may be utilized to match the change in growth rate to a desired value. The controller may employ diverter drops or flow cycles to enable adjustments to the change in growth rate.

Figure 6:
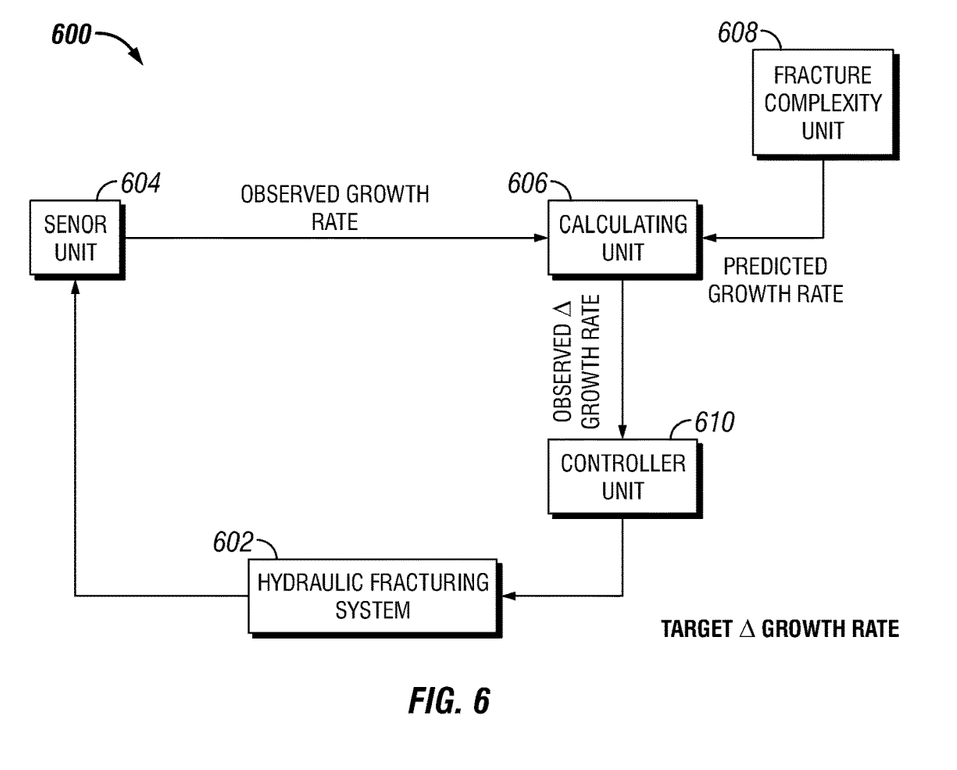
FIG. 6 is a diagram for hydraulic fracturing system in accordance with one or more embodiments of the disclosure.

FIG. 6 is a diagram for system 600 for estimating fracture complexity in a hydraulic fracturing operation in accordance with one or more embodiments of the disclosure. The system 600, or one or more components thereof, may take the form of a hardware embodiment, a software embodiment (including firmware, resident software, micro-code, etc.), or an embodiment combining software and hardware aspects as further discussed with respect to information handling system 140 in FIG. 7. As shown, a hydraulic fracturing system 602 provides signal inputs to sensor unit 604. Sensor unit 604 converts signal inputs into measurements including pressure, dimensional information, and other hydraulic operations data. Additional signal inputs may include a fracture geometry. Signal inputs from sensor unit 604 are communicated to calculating unit 606. Calculating unit 606 may determine an observed fracture growth rate as discussed with respect to FIG. 5, block 506. Additionally, calculating unit 606 may determine a predicted fracture growth rate as discussed with respect to FIG. 5, block 508. Calculating unit 606 may communicate with fracture complexity unit 608. For example, calculating unit 606 may provide the observed fracture growth rate and the predicted fracture growth rate information to fracture complexity unit 608. Fracture complexity unit 608 may determine a fracture complexity value, or index, by calculating the difference between the observed fracture growth rate and the predicted fracture growth rate. Information, such as the fracture complexity index may be communicated back to calculating unit 606, and/or communicated to controller unit 610 whereby a determination is made to control one or more aspects of an ongoing hydraulic fracturing operation by sending one or more control signals to hydraulic fracturing system 602.

Figure 7:
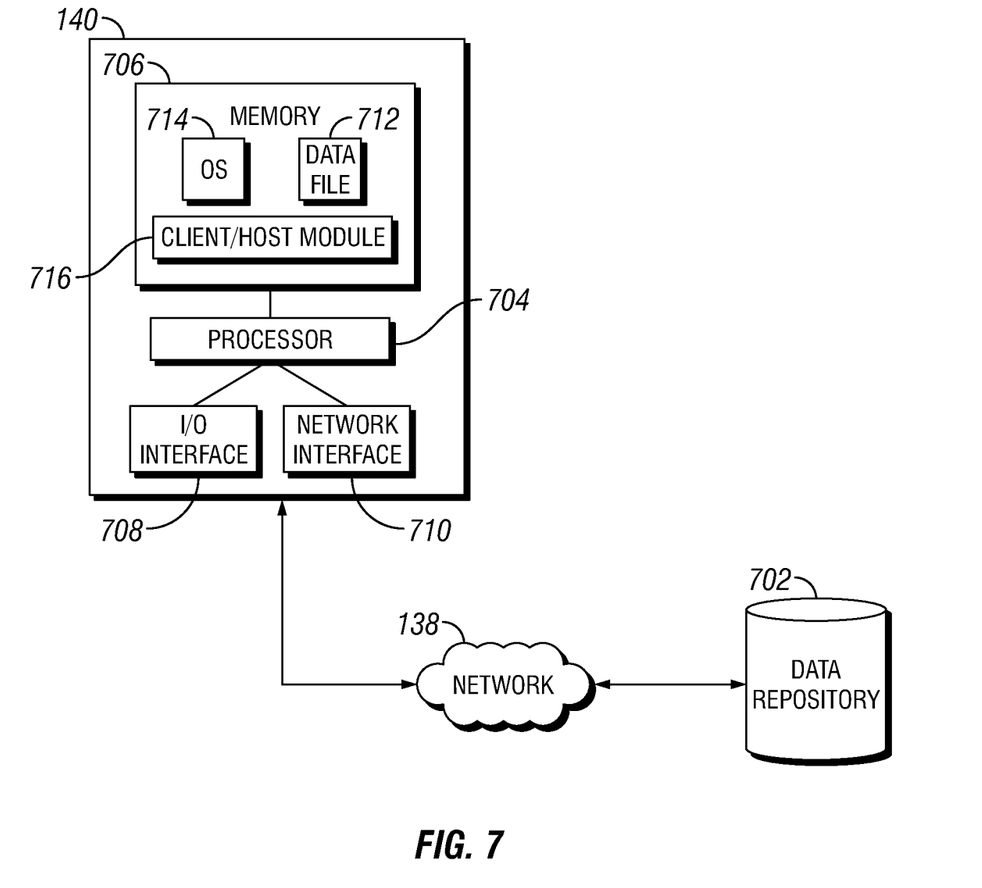
FIG. 7 illustrates an example of the information handling system.

FIG. 7 shows a view of the information handling system 140 introduced in FIG. 1. While single information handling system 140 is shown, it should be understood that the information handling system 140 may include multiple information handling systems as desired for a particular application. As shown, information handling system 140 is shown in communication over network 138. Information handling system 140 may be a standalone or integrated device such as a smart phone, tablet, PC, server, set top box, receiver, digital video recorder, streaming video player, console, and the like. Information handling system 140 may also include display devices such as a monitor featuring an operating system, media browser, and the ability to run one or more software applications.

As shown information handling system 140 is attached to a data repository 702. Data repository 702 may include one or more databases and information sources. Information handling system 140 may transmit information to or from data repository 702 for distribution over network 138 other network connected devices (not shown). In an example embodiment, information handling system 140 may process and provide information from data repository 702 for wellbore information including depths, type, wellbore configuration, sand concentrations, subterranean conditions, and hydraulic fluid composition attributes. Information handling system 140 may include a graphics library associated with providing design information associated with layout, fonts, colors, and the like that are associated with an information interface. Information handling system 140 may comprise a computing device as described herein. Consistent with embodiments of the disclosure, information handling system 140 may comprise one or more software applications (i.e., a series of instructions configured for execution by a processing unit) associated with another component, such as one or more servers or dedicated content devices.

Network 138 (also referred herein as distribution network or communication network) is, generally, used and implemented by a service provider (such as, but not limited to, a wired and/or wireless communication service provider). Network 138 additionally refers to infrastructure, including apparatuses and methods, operative and utilized to communicate data and/or signals between information handling system 140 and other networked devices. Similarly, for example and not limitation, network 138 may include current and future wired and/or wireless communication infrastructure for communicating data and/or signals with other communication networks, such as the internet. Network 138 may take one or more forms, or a combination thereof. Network 138 may also allow for real-time, off-line, and/or batch transactions to be transmitted between or among information handling system 140 and one or more networked devices, such as data repository 702. Due to network connectivity, various methodologies as described herein may be practiced in the context of distributed computing environments.

Although information handling system 140 is shown for simplicity in an example embodiment as being in communication with data repository 702 via one intervening network 138, it is to be understood that other network configurations may be used. For example, intervening network 138 may include a plurality of networks, each with devices such as gateways and routers for providing connectivity between or among networks. Instead of, or in addition to network 138, dedicated communication links may be used to connect the various devices in accordance with example embodiments of the disclosure.

Information handling system 140 may be any processor-driven device, such as, but not limited to, a personal computer, laptop computer, smartphone, tablet, handheld computer, dedicated processing device, and/or an array of computing devices. In addition to having processor 704, information handling system 140 may further include memory 706, input/output ("I/O") interface(s) 708, and network interface 710. Memory 706 may be any computer-readable medium, coupled to the processor, such as RAM, ROM, and/or a removable storage device for storing data files 712 and a database management system ("DBMS") to facilitate management of data files 712 and other data stored in memory 706 and/or stored in separate databases. Memory 706 may store data files 712 and various program modules, such as operating system ("OS") 714 and client module 716. OS 714 may be, but is not limited to, Microsoft Windows®, Apple OSX®, Apple iOS®, Apple iPadOS®, Unix, Oracle Java®, Linux, Android, or a mainframe operating system. Client module 716 may be an internet browser or other software, including a dedicated program, for interacting with information handling system 140.

Suitable processors, such as processors 704 of information handling system 140, may comprise any processor including but not limited to a microprocessor, RISC, ARM, ASIC, and/or a state machine. Example processors may include those provided by Intel Corporation, AMD Corporation, ARM Holdings, IBM, Qualcomm, NVidia, Broadcom, Samsung, Marvell, TSMC, Apple, Texas Instruments, and Motorola Corporation. Such processors comprise, or may be in communication with media, for example computer-readable media, which stores instructions that, when executed by the processor, cause the processor to perform the elements described herein.

When needed, data or information stored in a memory or database may be transmitted to a database, such as information repository 702, capable of receiving data, information, or data records from more than one database or other data storage devices. In other embodiments, the databases shown may be integrated or distributed into any number of databases or other data storage devices. As used herein, the term "computer-readable medium" may describe any form of memory or a propagated signal transmission medium. Propagated signals representing data and computer program instructions may be transferred between network devices and systems. Embodiments of computer-readable media include, but are not limited to, electronic, flash, optical, solid state, magnetic, or other storage or transmission device capable of providing a processor with computer-readable instructions. Various other forms of computer-readable media may transmit or carry instructions to a computer, including a router, private or public network, or other transmission device or channel, both wired and wireless. The instructions may comprise code from any computer-programming language, including but not limited to, for example, basic, binary, machine code, C, C++, C#, objective-C, Cobol, HTML, Java, JavaScript, Lisp, Markdown, Pascal, Perl, PHP, Python, Ruby, SQL, Swift, Visual Basic, XML, and R.

Generally, network devices and systems, including information handling system 140 have hardware and/or software for transmitting and receiving data and/or computer-executable instructions over a communications link and a memory for storing data and/or computer-executable instructions. These network devices and systems may also include a processor for processing data and executing computer-executable instructions locally and over network 138, as well as other internal and peripheral components that are known in the art.

Still referring to information handling system 140, the I/O interface(s) 708 may facilitate communication between the processor 704 and various I/O devices, such as a keyboard, mouse, printer, microphone, speaker, monitor, touch screen, camera, bar code readers/scanners, RFID readers, and the like. Network interface 710 may take any of a number of forms, such as a network interface card, modem, wireless network card, embedded device, and the like. It will be appreciated that while information handling system 140 has been illustrated as a single computer or processor, information handling system 140 may be comprised of a group of computers or processors, according to an example embodiment of the disclosure.

Numerous other operating environments, system architectures, and device configurations are possible. Other system embodiments may include fewer or greater numbers of components and may incorporate some or all of the functionality described with respect to the system components shown in FIG. 7. For example, in one embodiment information handling system 140 may be implemented as a specialized processing machine that includes hardware and/or software for performing the methods described herein. In addition, the processor and/or processing capabilities of information handling system 140, or any portion or combination thereof. Accordingly, embodiments of the disclosure should not be construed as being limited to any particular operating environment, system architecture, or device configuration. Alternatively, systems and methods of the present disclosure may be implemented, at least in part, with non-transitory computer-readable media. Non-transitory computer-readable media may include any instrumentality or aggregation of instrumentalities that may retain data and/or instructions for a period of time.

In some cases, signal inputs, according to one of the example embodiments may be displayed on a display associated with information handling system 140. In yet still other example embodiments, the information handling system 140 may forward gathered data to another system, such as another information handling system 140 at the operations center of an oilfield services provider, the operations center remote from the well location.

Accordingly, the systems and methods disclosed herein can provide estimation of fracture complexity. The systems, apparatus, and methods may include any of the various features disclosed herein, including one or more of the following statements.

Statement 1. A method of determining fracture complexity may comprise receiving one or more signal inputs from a fracturing operation, calculating an observed fracture growth rate based at least partially on the one or more signal inputs, calculating a predicted fracture growth rate, determining a fracture complexity value, and applying a control technique to make adjustments a hydraulic stimulation operation based at least in part on the fracture complexity value.

Statement 2. The method of statement 1, wherein the step of determining a fracture complexity value comprises calculating a difference between the observed fracture growth rate and the predicted fracture growth rate.

Statement 3. The method of statement 1 or statement 2, wherein the step of receiving one of more signal inputs comprises determining one or more fracture dimensional inputs at a well system.

Statement 4. The method of any proceeding statement, wherein the step of receiving one of more signal inputs comprises retrieving the one or more signal inputs from a data repository.

Statement 5. The method of any proceeding statement, wherein the one of more signal inputs includes a fracture geometry.

Statement 6. The method of any proceeding statement, wherein the step of calculating the predicted fracture growth rate is performed using a PKN estimation planar fracture model using flowrate information.

Statement 7. The method of any proceeding statement, wherein the step of calculating the observed fracture growth rate is performed using a planar fracture calculation, based at least in part on real time measurements of a response, such as pressure or stress or microseismic response.

Statement 8. A method for determining fracture complexity my comprise determining a predicted fracture growth rate, determining an observed fracture growth rate, generating a fracture complexity index by calculating the a difference between the predicted fracture growth rate and the observed fracture growth rate, evaluating the fracture complexity index, and applying a control technique to adjust one or more hydraulic stimulation parameters based at least in part on the fracture complexity index.

Statement 9. The method of statement 8 wherein the step generating a complexity index further comprises calculating the difference between the predicted first fracture growth rate and the observed second fracture growth rate.

Statement 10. The method of statement 8 or statement 9, further comprising receiving one or more signal inputs.

Statement 11. The method of statement 8, further comprising receiving one or more signal inputs from a data repository.

Statement 12. The method of statement 8, wherein the step of applying a control technique is done in real-time.

Statement 13. The method of statement 8, wherein the step of calculating the predicted fracture growth rate is performed using a planar fracture model using flowrate information PKN estimation model.

Statement 14. The method of statement 8, wherein the step of calculating the observed fracture growth rate is performed using a planar fracture calculation.

Statement 15. A system for determining a fracture complexity for a hydraulic fracturing operation may comprise a hydraulic fracturing system, a sensor unit to receive one or more signal inputs, a calculating unit, a fracture complexity unit, and a controller unit to apply a control technique to adjust one or more hydraulic stimulation parameters on the hydraulic fracturing system.

Statement 16. The system of statement 15, wherein the one or more signal inputs are converted to hydraulic measurement data.

Statement 17. The system of statement 15 or statement 16, wherein the one or more one or more signal inputs include a pressure signal.

Statement 18. The system of any one of statements 15 to 17, wherein the calculating unit receives information from the sensor unit and determines a predicted fracture growth rate.

Statement 19. The system of any one of statements 15 to 18, wherein the calculating unit receives information from the sensor unit and determines an observed fracture growth rate.

Statement 20. The system of statement 19, wherein the fracture complexity unit calculates a fracture complexity index based in part, on the observed fracture growth rate determined by the calculating unit.

It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps, the compositions and methods may also "consist essentially of" or "consist of" the various components and steps. Moreover, the indefinite articles "a" or "an," as used in the claims, are defined herein to mean one or more than one of the element that it introduces. The term "coupled" means directly or indirectly connected.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only, and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A method of determining fracture complexity comprising:
   receiving one or more signal inputs from a fracturing operation;
   calculating an observed fracture growth rate based at least partially on the one or more signal inputs;
   calculating a predicted fracture growth rate;
   determining a fracture complexity value, wherein the step of determining a fracture complexity value comprises calculating a difference between the observed fracture growth rate and the predicted fracture growth rate; and
   applying a control technique to make adjustments to a hydraulic stimulation operation based at least in part on the fracture complexity value.

2. The method of claim 1, wherein the step of applying the control technique is performed in real-time.

3. The method of claim 1, wherein the step of receiving one of more signal inputs comprises determining one or more fracture dimensional inputs at a well system.

4. The method of claim 1, wherein the step of receiving one of more signal inputs comprises retrieving the one of more signal inputs from a data repository.

5. The method of claim 1, wherein one of more signal inputs includes a fracture geometry.

6. The method of claim 1, wherein the step of calculating the predicted fracture growth rate is performed using a planar fracture model using flowrate information.

7. The method of claim 1, wherein the step of calculating the observed fracture growth rate is performed using a planar fracture calculation, based at least in part on real time measurements of a response comprising a pressure or stress or microseismic response.

8. A method for determining fracture complexity, comprising:
   determining a predicted fracture growth rate;
   determining an observed fracture growth rate;
   generating a fracture complexity index by calculating a difference between the predicted fracture growth rate and the observed fracture growth rate;
   evaluating the fracture complexity index; and
   applying a control technique to adjust one or more hydraulic stimulation parameters based at least in part on the fracture complexity index.

9. The method of claim 8 wherein generating a complexity index further comprises calculating the difference between the predicted fracture growth rate and the observed fracture growth rate.

10. The method of claim 8, further comprising receiving one or more signal inputs.

11. The method of claim 8, further comprising receiving one or more signal inputs from a data repository.

12. The method of claim 8, wherein the step of applying a control technique is done in real-time.

13. The method of claim 8, wherein the step of calculating the predicted fracture growth rate is performed using a planar fracture model using flowrate information.

14. The method of claim 8, wherein the step of calculating the observed fracture growth rate is performed using a planar fracture calculation.

15. A system for determining a fracture complexity for a hydraulic fracturing operation comprising:
   a hydraulic fracturing system;
   a sensor unit to receive one or more signal inputs;
   a calculating unit configured to receive information from the sensor unit to determine a predicted fracture growth rate and an observed fracture growth rate;
   a fracture complexity unit configured to determine a fracture complexity value based on the difference between the observed fracture growth rate and the predicted fracture growth rate; and
   a controller unit to apply a control technique to adjust one or more hydraulic stimulation parameters on the hydraulic fracturing system based at least in part on the fracture complexity value.

16. The system of claim 15, wherein the one or more signal inputs are converted to hydraulic measurement data.

17. The system of claim 15, wherein the one or more one or more signal inputs include a pressure signal.

18. The system of claim 15, wherein the calculating unit is further configured to determine the predicted fracture growth rate with a planar fracture model using flowrate information.

19. The system of claim 15, wherein the calculating unit is further configured to determine the observed fracture growth rate with a planar fracture calculation.

20. The system of claim 19, wherein the fracture complexity unit calculates a fracture complexity index based in part, on the observed fracture growth rate determined by the calculating unit.

* * * * *